United States Patent [19]

Wildgruber

[11] 4,256,950
[45] Mar. 17, 1981

[54] ELECTRICALLY HEATED ANIMAL WATERER

[76] Inventor: Georg Wildgruber, Münchnerstr. 44/Postf. 34, 8068 Pfaffenhofen, Fed. Rep. of Germany

[21] Appl. No.: 900,002

[22] Filed: Apr. 25, 1978

[51] Int. Cl.³ .......................... A01K 7/00; F24H 1/20; H05B 3/82; B67D 5/62
[52] U.S. Cl. ...................................... 219/306; 119/73; 119/77; 137/341; 219/214; 219/314; 219/316; 219/335; 219/437; 219/523; 222/146 HE
[58] Field of Search ............... 219/214, 310, 312, 314, 219/316, 318, 319, 335–338, 523, 437; 222/146 R, 146 H, 146 HE; 119/73, 77; 137/341

[56] References Cited

U.S. PATENT DOCUMENTS

| 903,041 | 11/1908 | Yerian et al. | 119/77 |
|---|---|---|---|
| 1,643,673 | 9/1927 | Merrill | 219/523 X |
| 1,787,703 | 1/1931 | Rau | 119/73 |
| 1,821,478 | 9/1931 | Pledger | 119/73 |
| 2,150,762 | 3/1939 | Edwards et al. | 219/336 X |
| 2,209,430 | 7/1940 | Turshin | 219/316 |
| 2,414,351 | 1/1947 | Bender | 219/523 |
| 2,528,742 | 11/1950 | Coffing | 119/73 X |
| 2,678,026 | 5/1954 | Rue et al. | 119/73 |
| 3,100,711 | 8/1963 | Eisler | 219/523 X |
| 3,557,344 | 1/1971 | De Crosta | 219/316 |

FOREIGN PATENT DOCUMENTS 827240  1/1952  Fed. Rep. of Germany ...... 222/146 R

Primary Examiner—A. Bartis
Attorney, Agent, or Firm—Craig and Antonelli

[57] ABSTRACT

A livestock watering device includes a liquid supply tank having an access opening in its top and an outlet opening in its lower end. A removable lid hermetically closes the access opening and an automatic feed means transfers liquid through the outlet opening to a collecting vessel arranged therebeneath in response to liquid consumption from the vessel. An electric heating element is attached to the lid and extends into the tank and is immersed in the liquid therein. The heating element comprises a resistance heating foil inserted between two concentric tubes sealably connected together to electrically isolate the foil from the liquid in the tank. The tubes define a tubular structure having a first open end removably secured to the lid and a second open end spaced above the bottom of the tank whereby the liquid in the tank is heated by contact with the inner and outer surfaces of the tubular structure. A liquid replenishment opening covered by a removable closure is provided in the lid for enabling liquid to be poured into the tank through said tubular structure.

6 Claims, 2 Drawing Figures

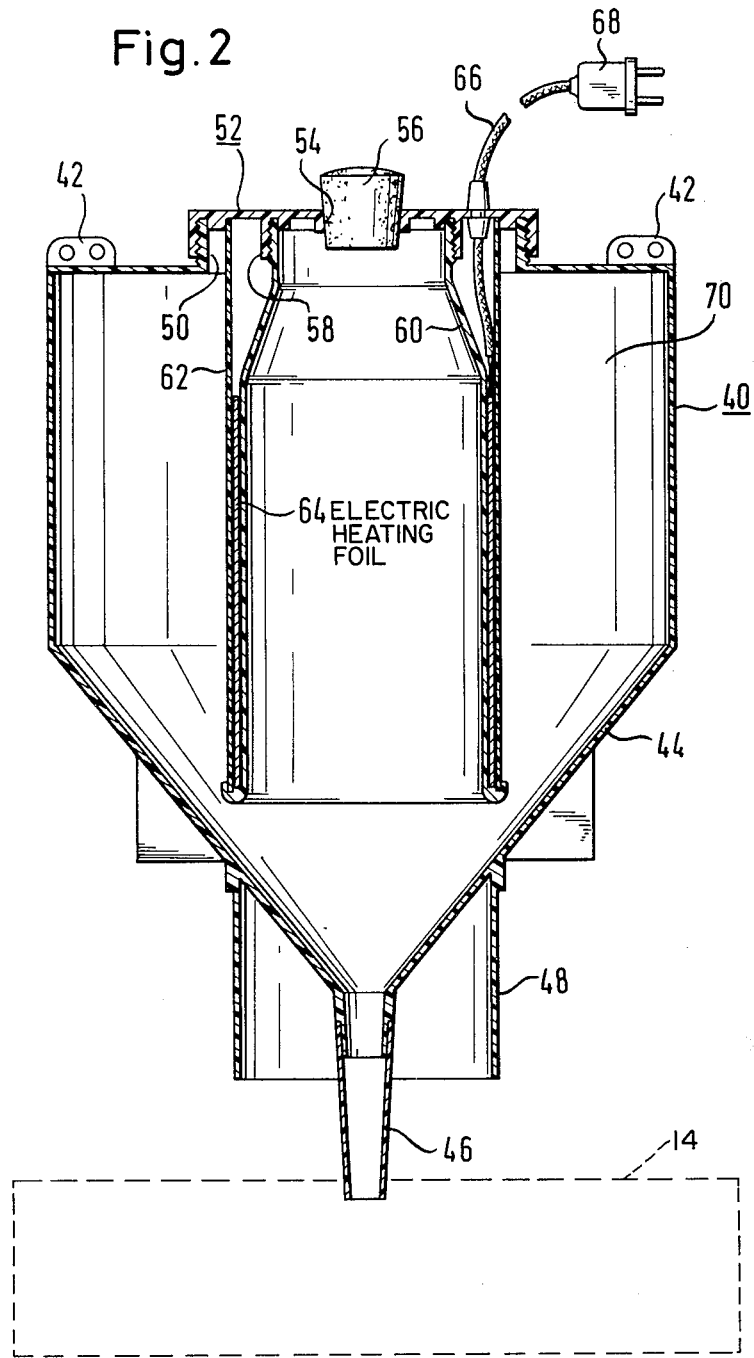

ELECTRICALLY HEATED ANIMAL WATERER

BACKGROUND OF THE INVENTION

As has been found out recently, piglings must be watered from the very moment of their birth (or, if lactation by the mother sow is too poor, they should be nursed with warm milk). The nursing liquid shall be not too cold and must be maintained scrupulously clean. Now considering the well-known fact that young pigs like grubbing up, the above provisos are very difficult to satisfy without much expenditure of work.

German Utility Model No. 6 902 052 discloses a watering device for piglings comprising a reservoir or supply tank which has a filling or inlet opening provided at the upper end of said tank and being adapted to be hermetically closed and an outlet opening at the lower end of said tank, said device further comprising a collecting vessel surrounding said outlet opening. The liquid contained in said supply tank can only flow therefrom and into said collecting vessel so long as said outlet opening is not covered by the liquid which has flowed out. Hence the liquid keeps flowing in an amount proportional to the amount of liquid drunk by the piglings. In order to maintain the liquid contained in said collecting vessel or watering trough in a warm condition, a heating means consisting of a closed container filled with hot water is provided beneath said collecting vessel. This heating vessel carries a connected side piece into which an immersion heater can be inserted.

This prior device has a drawback consisting in that before said liquid warms up sufficiently, it must remain in said collecting vessel for rather a long time. Consequently whenever the piglings are thirsty and drink a lot, cold liquid (be it water or milk) will follow so that the piglings may become cold, whereas if the piglings drink the liquid at a later time, then there is danger that the liquid will be spilled, soiled or polluted before it warms up sufficiently.

Furthermore, for achieving a good thermal transfer it is necessary that both the hot water vessel and the watering trough should be made of metal. However, metals corrode very quickly in the wet atmosphere of a pigsty.

What would be more advantageous as regards the transfer of heat would be a heating means projecting directly into said supply tank; such a measure meets, however, with difficulties as regards cleaning and sealing, particularly in the case of liquid tanks operating at below atmospheric pressure and adapted to be closed in a pressure-tight manner.

One object of the invention is to provide a watering and nursing device permitting a problemless heating-up of the liquid in the supply tank by simple means.

SUMMARY OF THE INVENTION

The watering device according to the invention comprises a supply tank having a filling or inlet opening provided at the upper end and adapted to be hermetically closed, an outlet opening at the lower end, holding means for said supply tank, a collecting vessel surrounding said outlet opening, and heating means for the liquid flowing from said supply tank into said collecting vessel, said heating means being constituted by an electric resistance heating foil immersing into the liquid space within said tank. Such heating foils having adequate resistance values are commercially available and they are insensitive to chemical influences, as well as hygienically faultless.

SHORT DESCRIPTION OF THE DRAWINGS

The invention will now be described in greater detail hereinafter with reference to the drawings in which:

FIG. 2 shows an axial section of a liquid container according to the present invention.

DESCRIPTION OF THE PREFERRED EMBODIMENT

Figure 1:
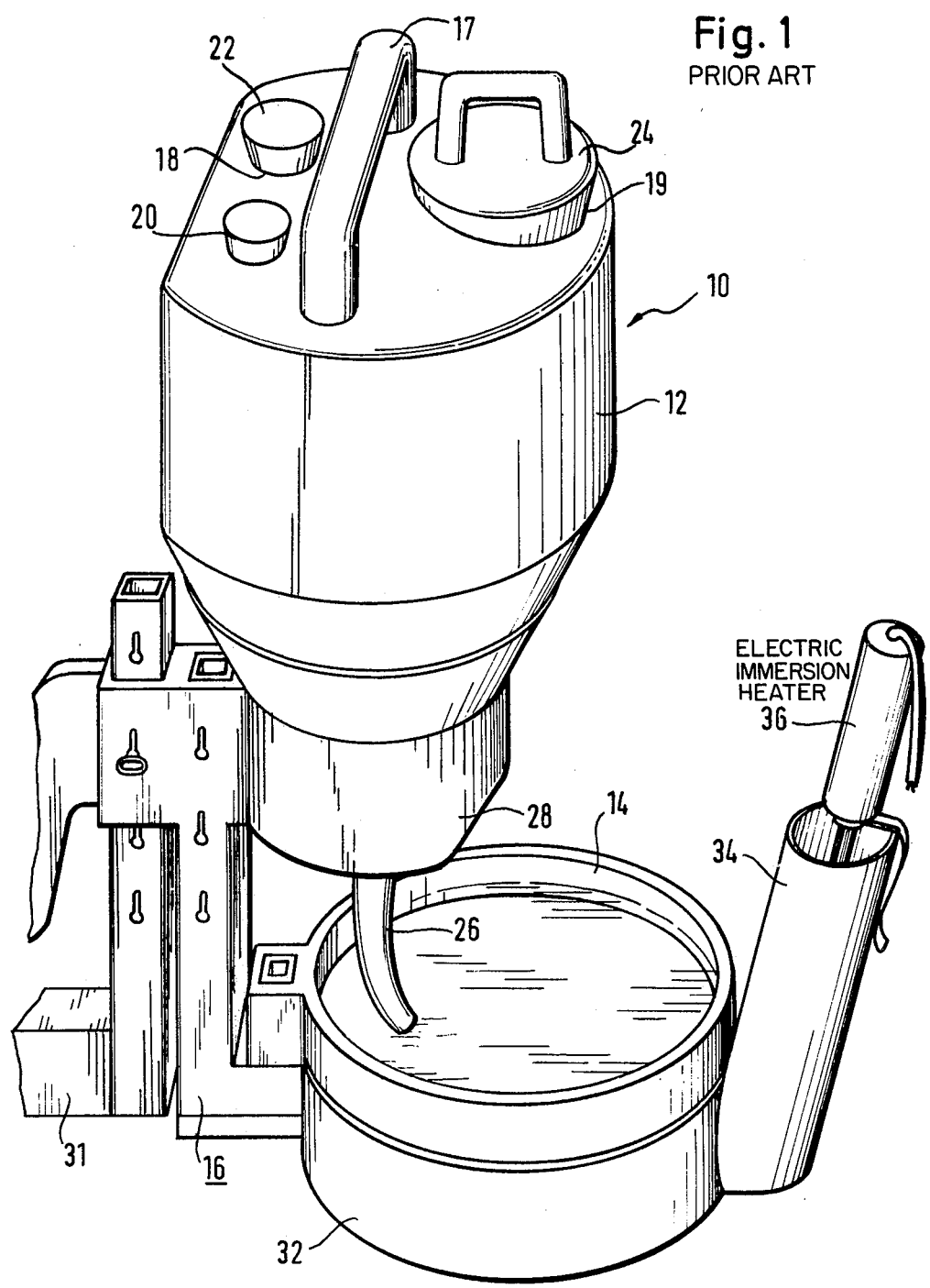
FIG. 1 shows a perspective view of a known pigling's watering devise.

The watering device 10 known per se and depicted in FIG. 1 comprises a reservoir 12, a collecting vessel or watering trough 14, a heating means 32 and a support 16 to which said reservoir, said collecting vessel and said heating means are secured removably and adjustably in height.

Said reservoir 12 which consists e. g. of a translucent and transparent plastic material has its top provided with a handle 17, a filling or inlet opening 18, a cleaning opening 19 and holding means for a plug 20. Openings 18 and 19 can be closed hermetically by adequate plugs 22 and 24.

At the lower end of said supply tank 12 the latter extends into a narrow funnel-like exit to form an outlet opening to which a flexible tube 26 is connected. The outlet opening of said tube 26 is adapted to be closed by a plug 20 held on the top of reservoir 12.

The outlet opening of said reservoir 12 is surrounded by a tubular connecting piece (not shown) which is to be used for holding and for setting said reservoir down onto the floor. Said tubular connecting piece fits into a holder 28 secured to support 16 so as to be adjustable in height. Support 16 may be secured either to a base plate 31 or to a wall so as to be adjustable in height.

The collecting vessel or watering trough 14 is secured to support 16 removably and adjustably in height. Underneath said watering trough 14 and in contact with this trough is provided a vessel 32 filled with water and comprising the heating means. The water vessel 32 has a joined piece 34 which extends laterally upwards and into which an immersion heater 36 (preferably provided with a thermostat) can be inserted.

The relative position of watering trough 14 and reservoir 12 is adjusted so that outlet tube 26 terminates shortly above the bottom of watering trough 14. The liquid (preferably water or diluted milk) contained in reservoir 12 flows then slowly out of outlet tube 26 until the liquid amount in watering trough 14 is at a level such that the outlet opening of said tube is covered. Thus whenever the piglings come and drink, only so much liquid flow will follow until this state is achieved again.

If the watering trough 14 has become dirty, it can be removed in one single step and exchanged with a clean watering trough. The outlet opening of tube 26 can meanwhile be closed by plug 20.

The cleansing of said reservoir can take place readily and thoroughly because the absolutely smooth interior of the tank is readily accessible by way of the large cleansing opening 19.

When very young piglings are involved, in particular when breeding piglings without a mother sow, it is frequently advantageous to provide the piglings with sucking means for a certain time. To this end, it is possible to substitute watering trough 14 for a similar collecting vessel carrying one or more sucking spigots (not shown) at the side wall thereof.

In this watering device of a known structure, for the reasons mentioned hereinabove, it is quite a problem in knowing how to carry out the heating of the watering liquid. That is why the improvement according to this invention has been developed, so that the heating means is incorporated into said supply tank. A longitudinal sectional view of a preferred embodiment thereof is shown in FIG. 2 wherein, however, neither the collecting vessel nor the support means are depicted since they do not involve any problems whatever.

The reservoir 40 is preferably made of plastic material and has suitable supporting apertured lugs 42, whereas its lower portion is merging in a funnel 44 leading to an outlet pipe 46. Pipe 46 in turn terminates and opens into a collecting vessel, e.g. a watering trough, watering groove, sucking spigot or the like (not shown). A tubular connecting piece 48 is utilized for holding and setting the tank down onto the floor after removal of outlet pipe 46.

To ensure that liquid contained within reservoir 40 will flow out only according to need, subatmospheric pressure must prevail above the liquid level. To maintain such a pressure below atmospheric, the reservoir must be hermetically closed. On the other hand, there must be an indispensable possibility of a thorough cleansing. To ensure both, on the top of reservoir 40 is provided a cleansing opening 50 adapted to be closed by a screwable lid or cover 52 in a pressure-tight manner. Lid 52 in turn has a smaller replenishing opening 54 adapted to be closed by a rubber plug 56.

At its lower side, lid 52 is provided with a threaded joining piece 58 to which a plastic tube 60 is screwed. Tube 60 is concentrically surrounded by a tube 62 also made of plastic material.

Both tubes are interconnected at their lower ends. Between the two tubes 60, 62 is provided a heating foil 64 having its connecting line 66 outwardly extending through lid 52 in a pressure-tight manner. Said connecting line is provided with a contact plug 68 for connection to the electric supply line.

Thus by unscrewing lid 52 also the heating means immersing into liquid space 70 will be removed from said tank and for its part, can be subjected to thorough cleansing and inspection.

A heating foil 64 is enclosed between both tubes 60 and 62 and therefore normally does not contact the watering liquid. Moreover, said foil—as already pointed out—is insensitive to liquids and is furthermore rugged and hygienically without fault.

The invention is not restricted to the described and shown embodiment but can undergo any modifications within the know-how of those skilled in the art.

I claim:

1. A livestock watering device comprising: a liquid supply tank having an access opening provided at its top and an outlet opening at its lower end; a collecting vessel arranged underneath said supply tank; holding means for said supply tank; a lid removably mounted over said access opening of said supply tank, said lid forming a pressure-tight seal with said tank to close said access opening; an automatic feed means for transferring liquid from said tank to said vessel through said outlet opening, said feed means being operable in response to liquid removal from said vessel; and a heating means in said tank for heating the liquid contained in said tank, said heating means being attached to said lid in a manner extending into said tank so as to be immersible in liquids contained in said tank, wherein said heating means is formed as an electric resistance heating foil inserted between first and second concentrically aligned tubes, said tubes being sealably connected together in a manner electrically isolating said foil from the liquid in the tank, said tubes defining a tubular structure having first and second open ends, means securing the first open end of the tubular structure to the inner surface of said lid, the second open end of said tubular structure being spaced above the bottom of said tank whereby the liquid in the tank is in direct contact with the inner and outer surfaces of said tubular structure.

2. The livestock watering device of claim 1, wherein said securing means permit a separable attachment of said tubular structure to said lid.

3. The livestock watering device of claim 2, wherein said securing means comprise engageable screw threads between said lid and the innermost of said tubes.

4. The livestock watering device of claim 1, wherein said tubes comprise a pair of constant diameter cylinders.

5. The livestock watering device of claim 1 and further comprising a liquid replenishment opening centrally positioned in said lid for enabling liquid to be directly supplied into the interior of said tubular structure and a removable closure means for sealing said liquid replenishment opening.

6. The livestock watering device of claim 1 or 5, wherein said tubes, said supply tank and said lid are constructed of a plastic material, said lid being screwed to said tank to form said pressure-tight seal.

* * * * *